UNITED STATES PATENT OFFICE.

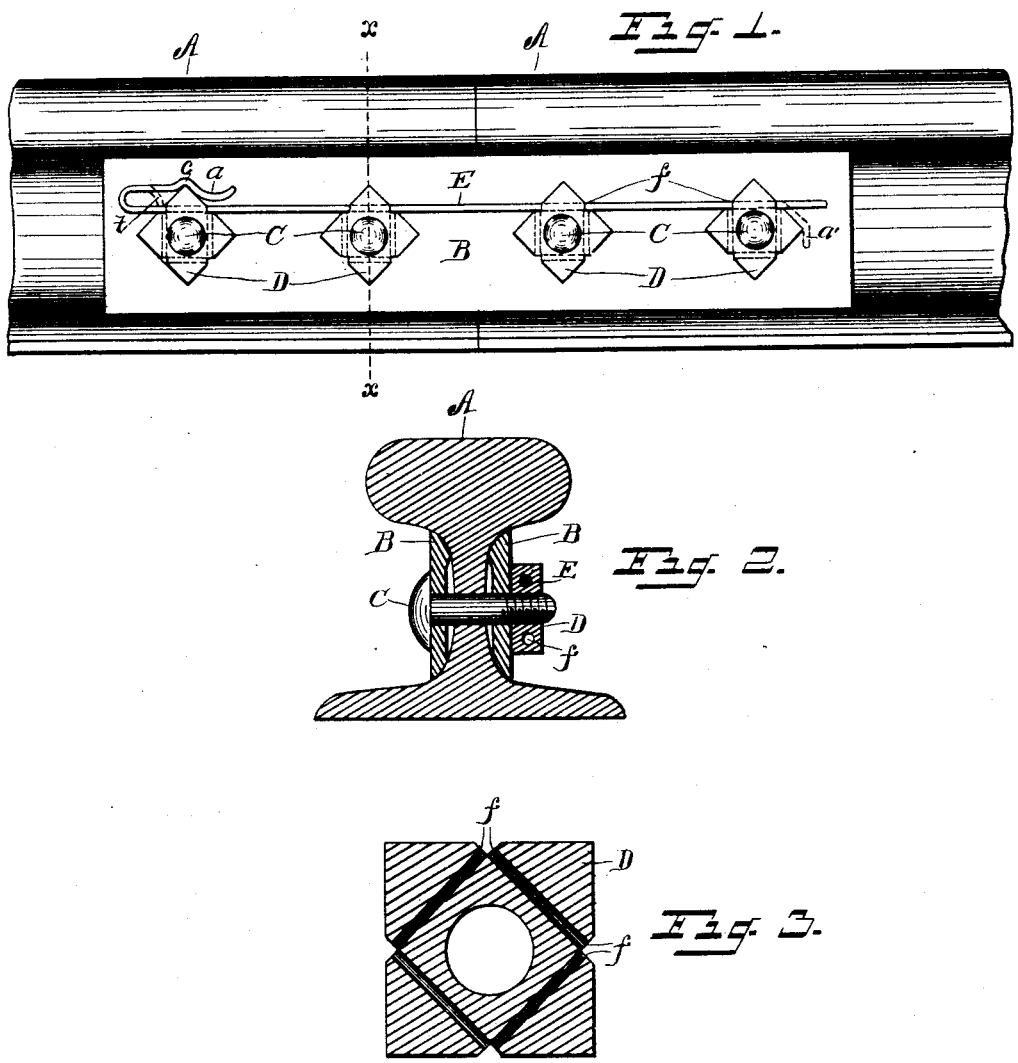

ANDREW J. GOULD, OF JACKSON, MICHIGAN.

NUT-LOCK.

SPECIFICATION forming part of Letters Patent No. 471,608, dated March 29, 1892.

Application filed January 24, 1890. Serial No. 337,969. (No model.)

*To all whom it may concern:*

Be it known that I, ANDREW J. GOULD, a citizen of the United States, residing at Jackson, in the county of Jackson and State of Michigan, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in nut-locks especially adapted for locking the nuts of bolts that secure the fish-plates to the rails of a railway, as in joining the meeting ends of said rails, and also for locking two or more nuts of a series of bolts that are in line with each other.

The object of the invention is to provide a cheap and simple means that will effectually lock a series of nuts and that will permit of the nuts being quickly and easily unlocked when desired. This object is attained by the device illustrated in the accompanying drawings, in which—

Figure 1 is a side elevation of the meeting ends of two rails of a railway, showing the application of my device for locking the nuts of the bolts that secure the fish-plates by which said rails are joined. Fig. 2 is a cross-section on dotted line $x\ x$ of Fig. 1, the bolt being in elevation. Fig. 3 is an enlarged central section edgewise through the nut, showing the diagonal holes through the corners of the nut that receive the pin or key, whereby the nut is locked.

Referring to the letters of reference, A indicates the rails of a railway; B, the fish-plates joining said rails; C and D, the bolts and nuts, respectively, by which said plates are secured to the rails; and E, the pin or key for locking said nuts. The rails A, plates B, and bolts C are such as are in common use, and will therefore require no special mention.

To prepare the nuts D so that they may be locked in accordance with my improved means, said nuts are provided with the holes $f$, that pass diagonally through the four corners thereof and are adapted to snugly receive the locking-key E. The outer ends of said holes merge and pass through the edges of the nut centrally between its corners, as shown at $f$ in Fig. 3. The pin or key E is made, preferably, of steel wire and is of sufficient length to pass through the series of nuts to be locked.

To lock the parts, the nuts are first screwed onto the bolts tightly against the face of the plate B, and are turned so that the holes through the corners of the nuts will register with each other—that is, those that stand on the same horizontal plane. The key E is then passed through the holes $f$ of the series of nuts and secured therein by the spring end $a$ thereof, the bent portion $c$ of which, fitting over the corner of the nut, securely holds said key in place, as clearly shown in Fig. 1; or, if desired, the spring end $a$ may be dispensed with and instead a simple loop, as shown by dotted lines $t$, formed in the head end of the key and the key prevented from jarring out of the holes $f$ in the nut by bending the initial end of the key over the corner of the last of the series of nuts, as shown by dotted lines $a'$ in the same figure. It will now be apparent that the nuts being locked, as described, and shown in Fig. 1, are singly and collectively prevented from turning while the key E remains in the holes $f$ thereof, and that by simply withdrawing said key therefrom said nuts are unlocked from each other and may be turned as desired. By providing the nut with the holes $f$, passing diagonally through each of its four corners, when the nut draws tight against the plate B in screwing it onto the bolt C, should there be none of the holes $f$, that stand on the proper plane to receive the key E, it will require but a slight further turn of the nut, but a quarter-turn at most, to bring one of said holes in line to receive the key.

Having thus fully set forth my invention, what I claim as new, and desire to secure by Letters Patent, is—

In combination with the rails and fish-plates, the bolts passing therethrough, the nuts threaded to said bolts, said nuts having the holes $f$ formed in the edges thereof, and the metal key E, having the spring end $a$, provided with the bent portion $c$, as and for the purposes set forth.

In testimony whereof I affix my signature in presence of two witnesses.

ANDREW J. GOULD.

Witnesses:
E. S. WHEELER,
R. B. WHEELER.